UNITED STATES PATENT OFFICE.

GEORGE LUNGE, OF ZURICH, SWITZERLAND, AND CECIL HENRY MAXWELL LYTE, OF LONDON, ENGLAND.

PROCESS OF MAKING BASIC LEAD SALTS AND CAUSTIC ALKALI.

SPECIFICATION forming part of Letters Patent No. 510,979, dated December 19, 1893.

Application filed August 23, 1893. Serial No. 483,802. (No specimens.)

*To all whom it may concern:*

Be it known that we, GEORGE LUNGE, professor of chemistry at the Polytechnicum, Zurich, Switzerland, and CECIL HENRY MAXWELL LYTE, esquire, of 60 Finborough Road, London, S. W., England, have invented new and useful Improved Processes of Producing Basic Lead Salts and Obtaining Certain By-Products, of which the following is a full, clear, and exact description.

This invention relates to a process of conjointly producing basic lead salts from crude pig lead and obtaining certain by products by a continuous cycle of operations wherein the lead is oxidized, lead nitrate is formed by dissolving the oxid of lead, and is then decomposed by a soluble salt in the presence of some free base for the production of a basic lead salt which is insoluble or but sparingly soluble in the nitrate which is also produced by the decomposition, this nitrate being then decomposed to regenerate nitric acid for the production of more lead nitrate from a fresh batch of oxid of lead while, if the soluble salt which was used have an alkali base the whole of the base of the alkali nitrate is recovered as caustic alkali in solution which may either be evaporated for sale or be partially acidified for use over again as the soluble salt.

It is to be understood that the invention may be employed for the production of basic salts of lead other than the carbonate as well as of mixtures of basic salts of lead, but as the production of basic carbonate of lead is the principal object of the process, we will describe the invention as applied to the manufacture of this particular salt, it being understood that where caustic soda and sodium salts are referred to, potash and potassium salts are included. We proceed as follows: Crude pig lead is oxidized to form litharge which is dissolved in nitric acid to form lead nitrate. Any silver, copper, and other metallic impurities that may have been present in the crude lead are now eliminated from the lead nitrate by the addition of finely divided metallic lead, whereby the silver and some other metallic impurities are precipitated along with finely divided lead forming ultimately rich silver lead as a by product of the process. The purification of the lead nitrate is only required if crude pig lead has been used to form the lead oxid and by this means the cost of refining the lead is saved, at the same time that a valuable by product is obtained, but it is of course to be understood that, although for economical reasons crude lead would be used, the process is not limited in this respect, as it will be obvious that litharge made from refined lead might be used although with less advantage. To the solution of pure lead nitrate produced as above described, caustic soda and carbonate of soda are added in the proper proportions for precipitating from the lead nitrate the whole of the lead as basic lead carbonate, which precipitates, and leaves pure sodic nitrate. The relative proportions of the best commercial carbonate and of the best commercial caustic alkali are respectively sixty-seven per cent. and thirty-three per cent., but these proportions are by no means absolute. They may be varied as desired according to the amount of base or hydrate that is to be imparted to the lead carbonate. The complete precipitation of nitrate of lead by carbonate of soda and caustic soda will take place in the cold, but it may be found more practical on a large scale to assist this precipitation by the application of heat which may also render the precipitate more dense. The solution of sodic nitrate is separated from the precipitate by decantation and filtration and while being evaporated to dryness is mixed and stirred with such a quantity of ferric oxid as will prevent the fusing or fluxing of the sodic nitrate when the latter is heated and so maintain the mass in a porous condition throughout the operation next described. The mass is then heated to an incipient red heat (temperature of about 500° centigrade) in a retort of, say, iron or earthenware and is at the same time subjected to the chemical action of a mixed current of heated air and steam (at preferably the same temperature as that of the mass) which is caused to pass through the mass whose porosity permits of its easy permeation by the mixed current of heated air and steam, the effect of the intimate contact of the heated air and steam with the mass and the internal heating of the latter thus effected being that the temperature of decomposition is lowered so that while complete decomposition is effected nitrous fumes are evolved which are wholly, or almost wholly, convertible into nitric acid, at a much lower temperature than would be possible if only external heat were applied, or if the fluxing of the mass into a mixed solid and liquid condition were permitted, since in either of these cases the temperature of the decomposition would not be kept sufficiently low to avoid the splitting up of the nitrous fumes into constituents unconvertible into nitric acid. The proportion of ferric oxid (if "purple ore" be used) should be two parts by weight thereof, or more, to one part of nitrate of soda but the proportion of ferric oxid may be varied according to the kind used, its physical state, and degree of division. It must always be sufficient to prevent any fluxing of the mass, so as to render the mass easily permeable by the heated air and steam, the effect of which as above stated is to insure a sufficiently low temperature of decomposition to avoid the splitting up of the nitrogen oxids too far for recovery as nitric acid. When the mixed current of heated air and steam is passed through the heated mass as above described, a true, chemical action takes place by which the nitrate of soda is entirely converted into ferrite of soda with evolution of nitrous fumes, at such a temperature that nearly all of the nitric acid corresponding to the nitrate of soda is recoverable by air and water in a "Lunge plate tower," or other suitable apparatus, in the usual way, only a very small proportion of the oxids of nitrogen being destroyed. The quantity of steam in the mixed current is regulated in such manner that the recovered nitric acid is not too weak and the quantity of air is kept in due excess for reconverting the lower oxids of nitrogen into nitric acid in the "Lunge tower." The nitric acid thus regenerated is used for dissolving a fresh batch of litharge and the ferrite of soda is decomposed by heating with water into ferric oxid for use with a fresh batch of nitrate of soda, and a solution of caustic alkali which may be partly carbonated by means of carbonic acid for precipitating basic lead carbonate from a fresh batch of lead nitrate, or may be partly used with more carbonate of soda for that purpose and partly sold as caustic soda after evaporation in the usual way.

The reactions taking place in this process may be expressed as follows, the desilverization of the lead being omitted to avoid complication.

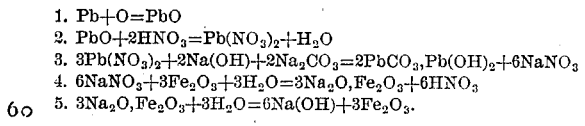

1. $Pb + O = PbO$
2. $PbO + 2HNO_3 = Pb(NO_3)_2 + H_2O$
3. $3Pb(NO_3)_2 + 2Na(OH) + 2Na_2CO_3 = 2PbCO_3, Pb(OH)_2 + 6NaNO_3$
4. $6NaNO_3 + 3Fe_2O_3 + 3H_2O = 3Na_2O, Fe_2O_3 + 6HNO_3$
5. $3Na_2O, Fe_2O_3 + 3H_2O = 6Na(OH) + 3Fe_2O_3$.

The course of operations is similar to that above described when any other basic salt of lead is to be made, the nature of the salt we have added to the lead nitrate alone being varied. Thus basic chloride of lead and caustic soda may be produced by the use of brine in lieu of carbonate of soda. Or a chloro-carbonate may be manufactured by substituting a mixture of carbonate and chloride of sodium, the same proportion of base in the form of caustic soda being maintained. In short, sulfate, oxalate, or any other salt of soda may be employed so long as on addition to the lead nitrate it produces a sufficiently insoluble basic salt of lead and a residual nitrate from which the nitric acid is capable of being recovered in the manner specified, for use over again.

We claim—

1. The herein described process of producing a basic insoluble or sparingly soluble salt of lead, and caustic alkali, which process consists in dissolving oxid of lead in nitric acid, decomposing the nitrate of lead by a soluble salt of an alkali in the presence of some free base so as to produce the basic salt of lead required, and a pure nitrate, then forming by double decomposition of this nitrate with ferric oxid, by means of heated air and steam, nitric acid for use over again and a ferrite corresponding in its base to that of the soluble salt used, then decomposing this ferrite into ferric oxid for use over again, and caustic alkali.

2. The herein described process of producing basic lead carbonate and caustic alkali, which process consists in dissolving lead oxide in nitric acid, decomposing the lead nitrate by soda carbonate and caustic soda so as to form basic lead carbonate and pure sodic nitrate, then forming by double decomposition of this nitrate with ferric oxide, by means of heated air and steam, nitric acid for use over again and ferrite of soda, and then decomposing this ferrite into ferric oxid and caustic soda, as specified.

3. The herein described process of producing a basic insoluble or sparingly soluble salt of lead and caustic alkali conjointly with the recovery of silver as silver lead, and of nitric acid and ferric oxid for use over again, which consists in oxidizing crude pig lead, converting the lead oxid into lead nitrate, precipitating the silver from the lead nitrate with finely divided lead, forming the basic salt of lead by addition of an alkaline carbonate and some free base, decomposing the alkaline nitrate formed by means of ferric oxid heated air and steam, decomposing the resulting ferrite into ferric oxid and caustic alkali, as specified.

Dated this 21st day of July, 1893.

GEORGE LUNGE.

Witnesses:
ALEXANDER SWOFF,
FRIEDRICH BACHOFEN,
*Both of Zurich, Chemists.*

Dated this 18th day of July, 1893.

CECIL HENRY MAXWELL LYTE.

Witnesses:
W. J. NORWOOD,
T. F. BARNES,
*Both of No. 17 Gracechurch Street, London.*